(12) United States Patent
Cooper et al.

(10) Patent No.: US 9,063,315 B2
(45) Date of Patent: Jun. 23, 2015

(54) OPTICAL CABLE, DOWNHOLE SYSTEM HAVING OPTICAL CABLE, AND METHOD THEREOF

(71) Applicants: Daniel B. Cooper, Christiansburg, VA (US); Paul F. Wysocki, Blacksburg, VA (US); Roger G. Duncan, Christiansburg, VA (US)

(72) Inventors: Daniel B. Cooper, Christiansburg, VA (US); Paul F. Wysocki, Blacksburg, VA (US); Roger G. Duncan, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/035,328

(22) Filed: Sep. 24, 2013

(65) Prior Publication Data

US 2015/0083904 A1 Mar. 26, 2015

(51) Int. Cl.
*G02B 6/00* (2006.01)
*G02B 6/44* (2006.01)
*G01L 1/24* (2006.01)

(52) U.S. Cl.
CPC .............. *G02B 6/4429* (2013.01); *G01L 1/242* (2013.01); *G02B 6/4402* (2013.01); *G02B 6/4415* (2013.01)

(58) Field of Classification Search
CPC .. G02B 6/4402; G02B 6/4415; G02B 6/4429; G01L 1/242
USPC .......................................................... 385/13
See application file for complete search history.

(56) References Cited

U.S. PATENT DOCUMENTS

| | | | | |
|---|---|---|---|---|
| 4,836,639 A | * | 6/1989 | Shamoto et al. | 385/109 |
| 4,859,025 A | * | 8/1989 | Houghton | 385/114 |
| 5,082,380 A | * | 1/1992 | Sutehall et al. | 385/114 |
| 6,137,936 A | * | 10/2000 | Fitz et al. | 385/113 |
| 6,459,837 B1 | * | 10/2002 | Fitz et al. | 385/113 |
| 6,516,124 B2 | * | 2/2003 | Po | 385/126 |
| 7,412,135 B2 | * | 8/2008 | Seifert et al. | 385/39 |
| 7,706,640 B2 | * | 4/2010 | Pizzorno et al. | 385/12 |
| 8,346,040 B2 | * | 1/2013 | Testu et al. | 385/103 |
| 8,676,012 B2 | * | 3/2014 | Bradley et al. | 385/113 |
| 2004/0112595 A1 | | 6/2004 | Bostick, III et al. | |
| 2012/0007717 A1 | | 1/2012 | De Jong | |
| 2012/0222487 A1 | | 9/2012 | Hill et al. | |
| 2012/0328253 A1 | * | 12/2012 | Hurley et al. | 385/103 |
| 2013/0094798 A1 | | 4/2013 | Duncan et al. | |

FOREIGN PATENT DOCUMENTS

| | | |
|---|---|---|
| JP | 8160265 A | 6/1996 |
| JP | 2013092036 A | 5/2013 |

OTHER PUBLICATIONS

D. Miller, et al. (Silixa Ltd.), "Vertical Seismic Profiling Using a Fibre-optic Cable as a Distributed Acoustic Sensor",74th EAGE Conference & Exhibition incorporating SPE EUROPEC 2012, Copenhagen, Denmark, Jun. 4-7, 2012, pp. 1-5.

(Continued)

*Primary Examiner* — Ryan Lepisto
(74) *Attorney, Agent, or Firm* — Cantor Colburn LLP

(57) ABSTRACT

An optical cable includes an outer tubing. At least one optical fiber disposed within the outer tubing. A stiffening member configured to bend with bending of the outer tubing; wherein the stiffening member shifts a neutral plane of the cable away from the at least one optical fiber. Also included is a method of increasing a bending sensitivity in an optical cable.

25 Claims, 6 Drawing Sheets

(56) References Cited

OTHER PUBLICATIONS

Weatherford International Ltd., "Downhole Optical Cable" Production Optimization, Houston, Texas, www.weatherford.com, 2005-2008 Weatherford, pp. 1-3.

International Search Report and Written Opinion of PCT Application No. PCT/US2014/050633, dated Nov. 21, 2014, pp. 1-12.

* cited by examiner

OPTICAL CABLE, DOWNHOLE SYSTEM HAVING OPTICAL CABLE, AND METHOD THEREOF

BACKGROUND

Distributed acoustic monitoring is becoming an important method for downhole monitoring of wells, with many potential applications. This technology involves the use of an optical cable having an optical fiber contained within a metal tube, with gels or other substances used to hold the fiber within the tube. As the cable is deformed, the length of the optical fiber is changed, which can be detected through proper optical interrogation of the fiber. Generally, this involves sending short bursts of light down the fiber, and recording the light that is reflected back via Rayleigh backscatter.

In general, in these applications, either incident acoustic pressure or alternatively, the vibration of a surface to which the optical cable is attached, results in the bending of the optical cable. Since the cable is predominately sensitive to longitudinal deformation, care must be taken to ensure that the bending of the cable actually produces a change in the length of the optical fiber. Attempts to increase the sensitivity of the fiber have placed the fiber away from the center of the cable, and nearer to the outside of the cable, as this increases the strain that occurs in the fiber. However, for some applications, such as vertical seismic profiling ("VSP"), even greater sensitivity of the fiber may be needed.

Thus, the art would be receptive to alternative devices and methods for improving the sensitivity of optical fibers in optical cables.

SUMMARY

An optical cable includes an outer tubing; at least one optical fiber disposed within the outer tubing; and, a stiffening member configured to bend with bending of the outer tubing; wherein the stiffening member shifts a neutral plane of the cable away from the at least one optical fiber.

An optical cable includes an outer tubing having a central axis, a stiffness of the outer tubing asymmetric with respect to the central axis; and, at least one optical fiber disposed within the outer tubing; wherein a distance between the at least one optical fiber and a neutral plane of the cable is greater than a distance between the at least one optical fiber and the central axis.

A method of increasing a bending sensitivity in an optical cable, the method includes shifting a neutral plane of the cable away from an optical fiber in the cable.

BRIEF DESCRIPTION OF THE DRAWINGS

Referring now to the drawings wherein like elements are numbered alike in the several Figures.

DETAILED DESCRIPTION

Figure 1:
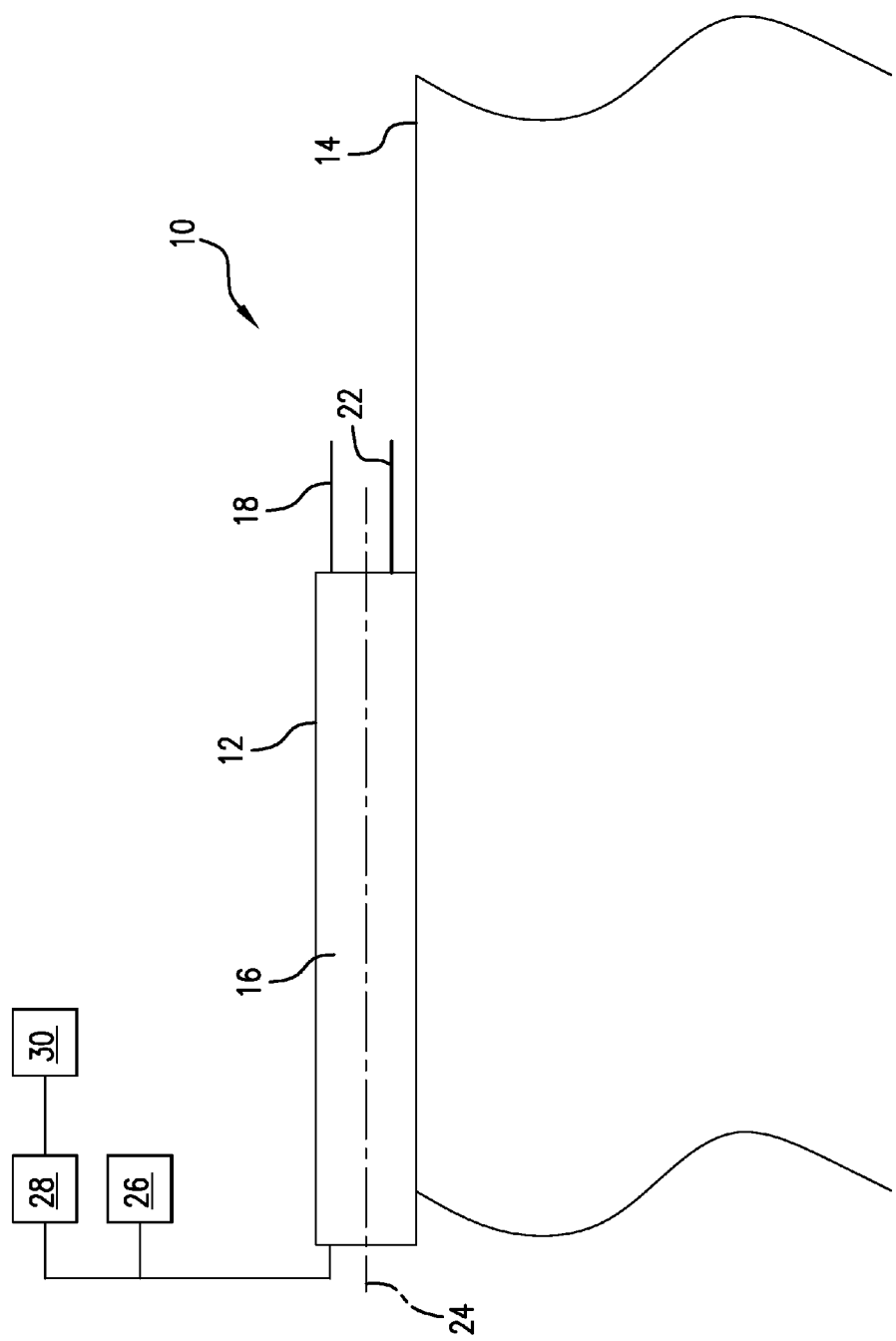
FIG. 1 is a side view and schematic view of an exemplary embodiment of a system for downhole sensing including an optical cable.

One exemplary embodiment of a system 10 for downhole sensing is shown in FIG. 1 and includes an optical cable 12 with improved bending sensitivity. The cable 12 is depicted in use with an exemplary downhole device 14. The downhole device 14 may be used in various aspects of oil production or exploration, and may be, for example, production tubing, a measurement-while-drilling ("MWD") tool, a borehole casing, a wireline logging device, a sandscreen, a fiber express tube, or any other downhole tool or device. While the cable 12 is illustrated in FIG. 1 on an exterior of the downhole device 14, depending on the device 14, the cable 12 may alternatively be located on an interior surface of the downhole device 14, or may even be included within a wall of the downhole device 14.

The cable 12 includes an outer tubing 16 (cable shell), at least one optical fiber 18 retained in place within the outer tubing 16 with gel or other holding substance 20 (FIGS. 2-6), and at least one stiffening element 22 which extends longitudinally within the tubing 16. The fiber 18 and stiffening element 22 are depicted as partially exposed in FIG. 1 for illustrative purposes, but can instead be fully enclosed within a full length of the outer tubing 16. In the illustrated embodiment, a cross-sectional shape of the outer tubing 16 is substantially uniform over the length of the tubing 16 and the cable 12 includes a central axis 24 passing through a centroid of the cross-sectional area of the cable 12 as shown. A cable having varying cross-sectional shapes over a length of its outer tubing, while not normally employed due to the expense in producing such a tubing or usefulness thereof, is nonetheless not excluded from the embodiments of an optical cable with improved bending sensitivity as will be described herein. When the cable 12 is secured to the downhole device 14, the stiffening element 22 may be positioned closer to the downhole device 14 than the optical fiber 18.

The system 10 including the cable 12 described herein is usable as a distributed fiber optic sensor or distributed acoustic sensor ("DAS"). The system 10 includes a light source 26 such as a laser, and light from the light source 26 is transferred for propagation along the fiber optic cable 12. Any optical radiation which is Rayleigh back-scattered within the optical fiber 18 is detected by photodetector 28. Any incident acoustic signal causes mechanical vibration of the fiber 18 which changes the amount of Rayleigh back-scattering at that part of the fiber 18. The variation in back-scatter is related to the movement of the fiber 18 and the amount of bending experienced by the fiber 18. The signal from the photodetector 28 is processed by a signal processor 30 and receivable by a user interface (not shown). The light source 26, photodetector 28, and signal processor 30 may be positioned at a surface location.

Figure 2:
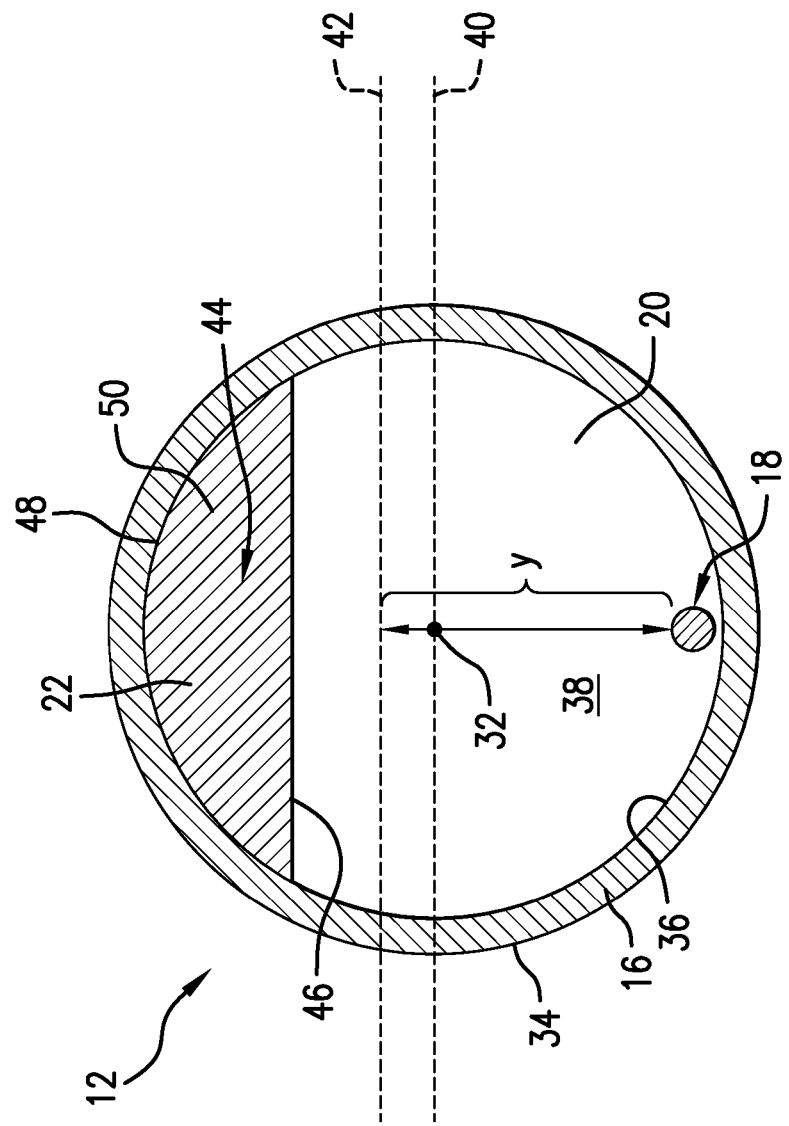
FIG. 2 is a cross-sectional view of one exemplary embodiment of the optical cable of FIG. 1.

In an exemplary embodiment shown in FIG. 2, the outer tubing 16 has a circular or at least substantially circular cross-section, although other cross-sections are also employable for the outer tubing 16 in the optical cable 12 with improved bending sensitivity. The outer tubing 16 includes a metal material, and the stiffness of the cable 12 to bending is primarily due to the outer tubing 16, due to its distance away from the center 32 (lying along the central axis 24) of the cable 12 and the stiffness of the tubing material (metal) relative to the materials of the inner components such as the holding substance 20 and one or more optical fibers 18. The outer tubing 16 includes an outer periphery 34 and an inner periphery 36. The gel or holding substance 20 secures the optical fiber 18 within an interior 38 of the tubing 16. As previously noted in FIG. 1, the cable 12 includes stiffening member 22, however in the absence of stiffening member 22, a cable having the outer tubing 16 would bend about the neutral plane 40 that passes, in the example of a circular cross-section, through the central axis 24 of the outer tubing 16. That is, for a symmetric cable, the central plane of the cable corresponds to the neutral plane 40, above which the cable is in tension due to the bending, and below which the cable is in compression (or vice-versa, depending upon the sign of the applied bending moment). Thus, it should be understood that the neutral plane 40 is the plane where the cable is not under longitudinal stress, either compression or tension.

In the mechanics of beams and other members subjected to bending (such as the optical cable 12), the longitudinal elements within the cable 12 are subjected to uniaxial stresses. These stresses are increased the further away from the neutral plane 40 an element is. Increased sensitivity is obtained by placing the fiber 18 further away from the neutral plane 40 of the cable 12, and thus the fiber 18 is located at the inner periphery 36 of the tubing 16. The stresses experienced by the fiber 18 are governed by the equation:

$$\sigma = My/I$$

where $\sigma$ represents the uniaxial stress applied to the element (fiber 18), M represents the applied bending moment, y represents the distance of the element (fiber 18) from the neutral plane of the cable 12, and I represents the area moment of inertia of the cable. 12 Strain ($\epsilon = \Delta L/L_0$, where $\Delta L$ is the change in length and $L_0$ is the original length) is a measure of how much an object is being stretched. Strain is caused by stress, and for the material of the fiber 18, stress and strain are linearly related.

While placement of the fiber 18 at the inner periphery 36 distances the fiber 18 from the neutral plane 40, the embodiments of a cable 12 having improved sensitivity to bending further distances the neutral plane from the fiber by moving the neutral plane of the cable 12 away from the fiber 18. This is accomplished by arraying the stiffness of the cable 12 asymmetrically with respect to the central axis 24 of the cable 12, such as by securing a longitudinal stiffening member 22 on a side of the cable 12 opposite the fiber 18. With the fiber 18 positioned at an outermost radial location along the inner periphery 36 of the tubing 16, the stiffening member 22 is disposed on a diametrically opposite side of the inner periphery 36 from the fiber 18. The addition of the stiffening member 22 to the cable 12 serves to move the neutral plane 42 of the cable 12 toward the stiffening member 22. The distance (y) of the optical fiber 18 from the neutral plane 42 of the cable 12 is increased, as compared to the distance of the optical fiber 18 from the neutral plane 40, thereby increasing the longitudinal stress ($\sigma$) applied to the optical fiber 18. This increased stress results in increased strain, and correspondingly, increased optical signal.

FIGS. 2-5 show alternative exemplary embodiments of the stiffening member 22. In FIG. 2, geometry of the cable is modified by the inclusion of a filled shape, and in particular a circular segment 44 as a stiffening element 22 to shift the neutral plane 42 of the cable 12 away from the optical fiber 18. The neutral plane 42 is shifted by a distance x from a parallel plane 40 passing through the central axis 24. Also, the chord 46 of the circular segment 44 is substantially parallel to the neutral plane 42. The arc 48 of the circular segment 44 may match a section of the inner periphery 36 of the tubing 16 so as to be nested therein. A distance between the fiber 18 and the neutral plane 42 of the cable 12 is greater than a distance between the chord 46 of the circular segment 44 and the neutral plane 42 of the cable 12. The circular segment 44 may be rigidly attached to the inner periphery 36 of the cable 12, or alternatively the outer tubing 16 is extruded so as to include the shape of the circular segment 44 therein. The circular segment 44 essentially serves as a thickened section 50 of the outer tubing 16, and other filled shapes may be employed to provide a thickness of the outer tubing 16 at a thickened section 50 of the outer tubing 16 diametrically opposite a location of the fiber 18 to be greater than a thickness of the outer tubing 16 at a location of the fiber 18.

Figure 3:
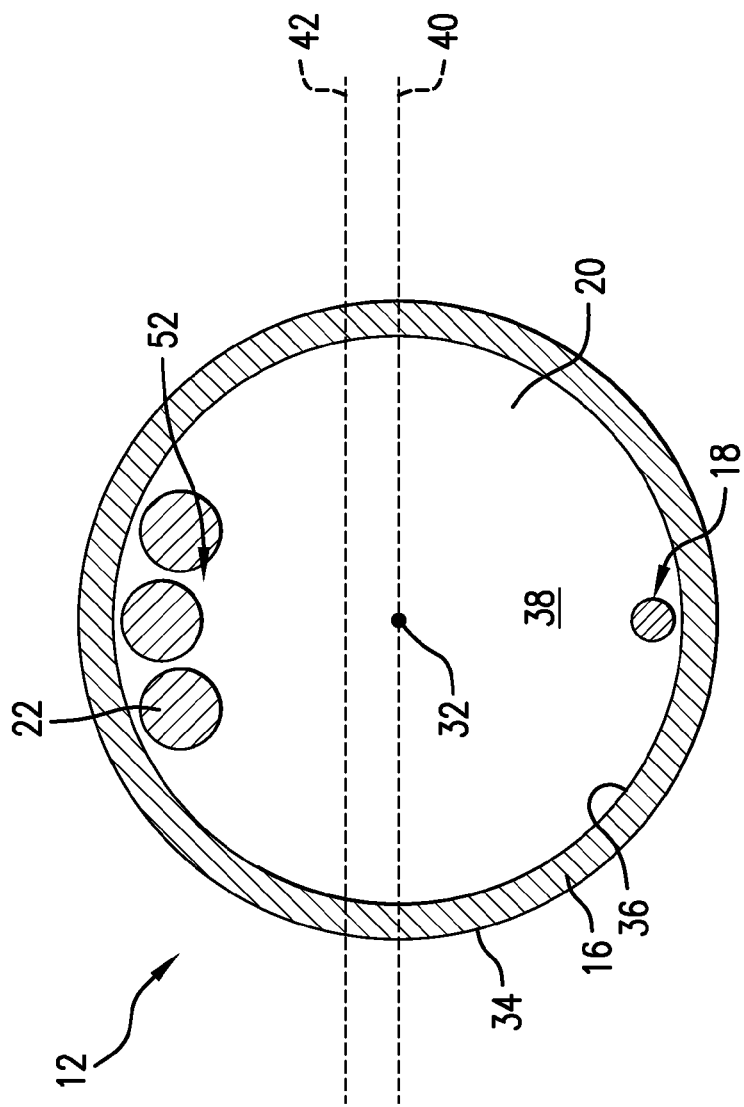
FIG. 3 is a cross-sectional view of another exemplary embodiment of the optical cable of FIG. 1.

In FIG. 3, geometry of the cable 12 is modified by a stiffening member 22 formed by one or more wires 52 rigidly secured to the inner periphery 36 of the tubing 16, and generally located diametrically opposite the fiber 18. As with the embodiment of FIG. 2, the wires 52 could be extruded with the tubing 16. While three circular wires 52 are shown in FIG. 3, the stiffening member 22 could alternatively be formed by any number of wires 52 and by any shape of such wires 52. A distance between the fiber 18 and the neutral plane 42 of the cable 12 is greater than a distance between the stiffening member 22 of FIG. 3 and the neutral plane 42 of the cable 12.

Figure 4:
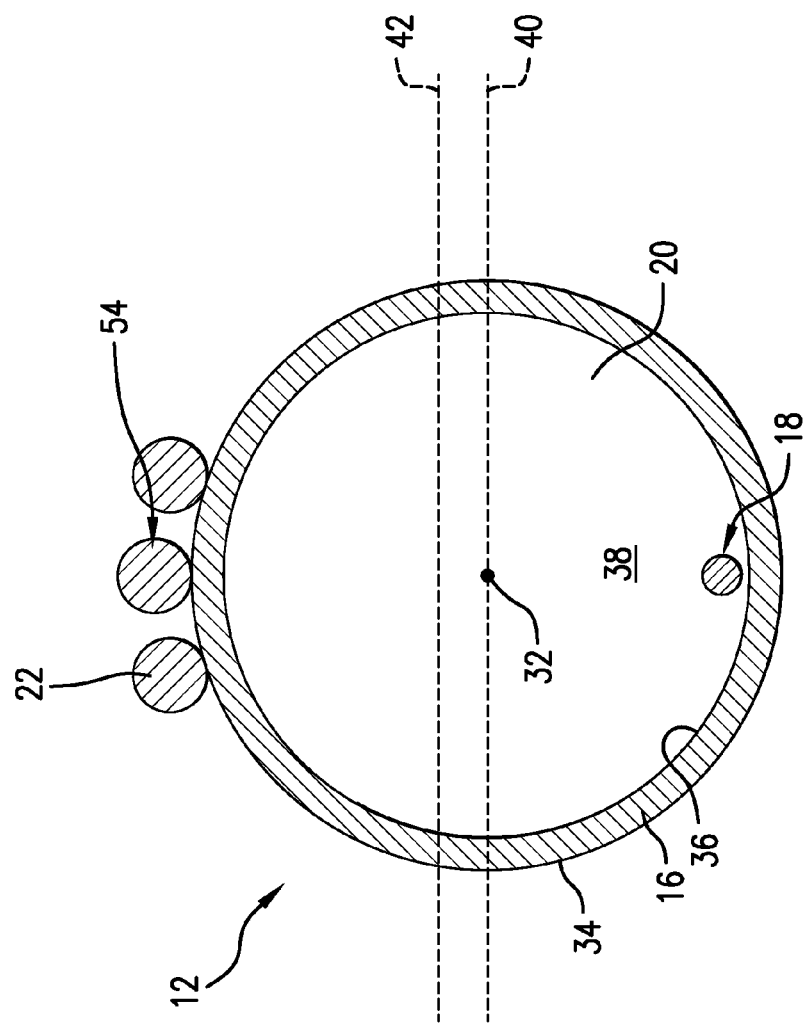
FIG. 4 is a cross-sectional view of yet another exemplary embodiment of the optical cable of FIG. 1.

In FIG. 4, geometry of the cable 12 is modified by a stiffening member 22 formed by a set of wires 54 rigidly secured on the outer periphery 34 of the tubing 16, and generally located diametrically opposite the fiber 18. As with the embodiment shown in FIG. 3, while three circular wires 54 are shown, the stiffening member 22 could alternatively be formed by any number of wires 54 and by any shape of such wires 54. A distance between the fiber 18 and the neutral plane 42 of the cable 12 is greater than a distance between the stiffening member 22 of FIG. 4 and the neutral plane 42 of the cable 12. Moreover, even higher stresses would be applied to the fiber 18 with the stiffening member 22 located exteriorly of the tubing 16 as in FIG. 4 due to the increased distance between the neutral plane 42 and the fiber 18, and as a result even higher signal strength. However, attaching the stiffening member 22 to the outer periphery 34 of the tubing 16 may render the cable 12 difficult to deploy in certain downhole operations. On the other hand, existing cabling may be retrofitted with the stiffening member 22 of FIG. 4 to adjust the distance of the fiber 18 from the neutral plane 42 of the cable 12.

Figure 5:
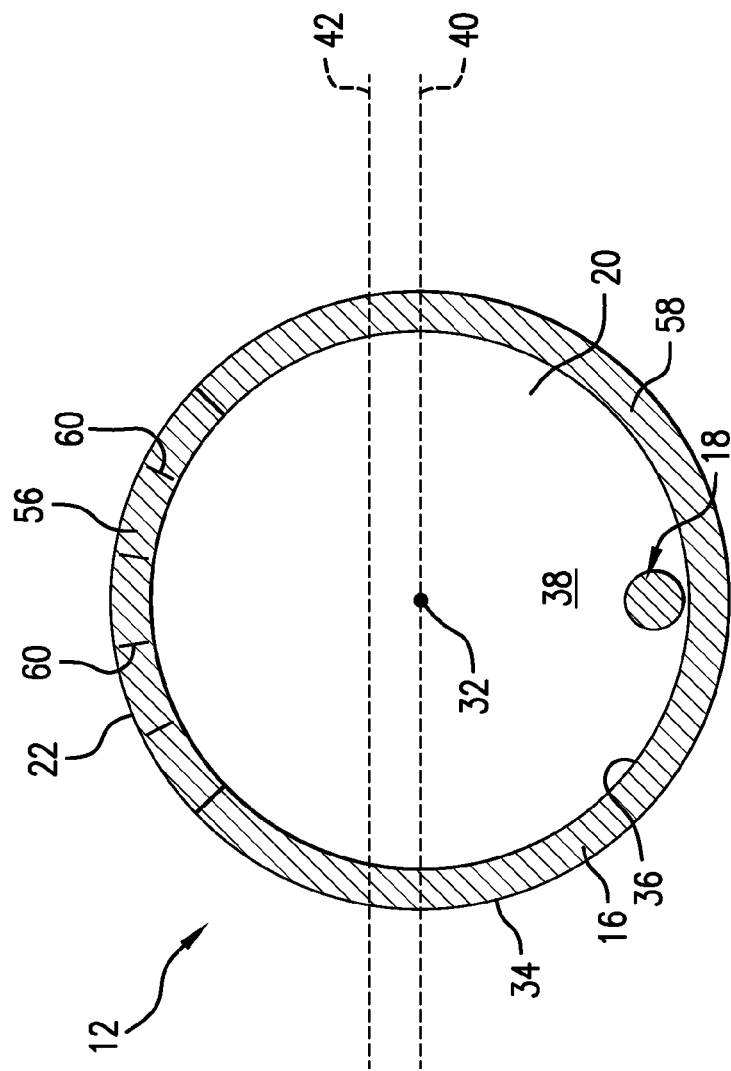
FIG. 5 is a cross-sectional view of still another exemplary embodiment of the optical cable of FIG. 1.

In FIG. 5, the geometry of the cable is not modified, but instead a stiffening member 22 is formed directly into the material of the outer tubing 16. That is, a stiffening material of a stiffening section 56 of the stiffening member 22 is selected to have greater rigidity than a material of the remainder 58 of the outer tubing 16. In such an embodiment, as with the other embodiments, the distance between the fiber 18 and the neutral plane 42 of the cable 12 is greater than a distance between the stiffening member 22 of FIG. 5 and the neutral plane 42 of the cable 12. The stiffening section 56 may be created from an entirely different material than that of the remainder 58 of the outer tubing 16, or alternatively may be the same material of the remainder 58 of the outer tubing 16 but with the addition of stiffening elements 60, such as strips of more rigid materials, embedded within the stiffening section 56. Thus, FIGS. 2-5 demonstrate alternative exemplary embodiments for mechanically adjusting the neutral plane 42 of the cable 12 to increase strain of the fiber 18.

Figure 6:
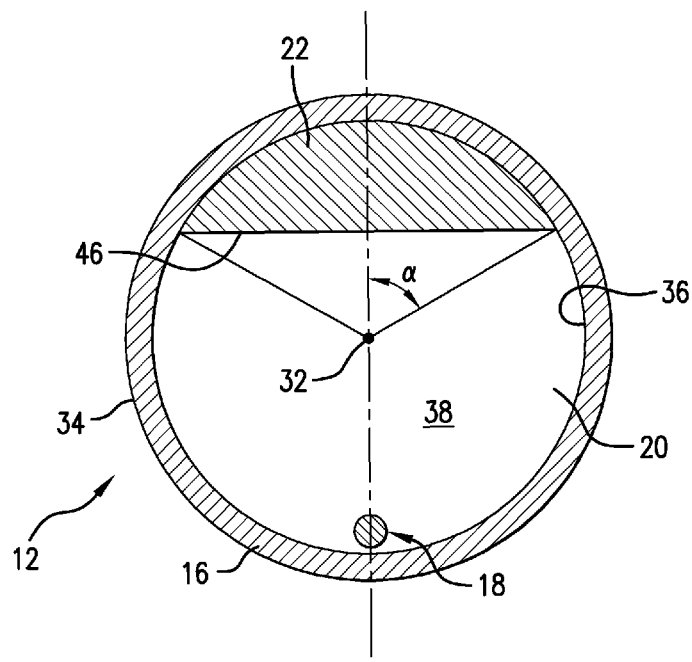
FIG. 6 is a cross-sectional view of the exemplary embodiment of the optical cable of FIG. 2.
Figure 7:
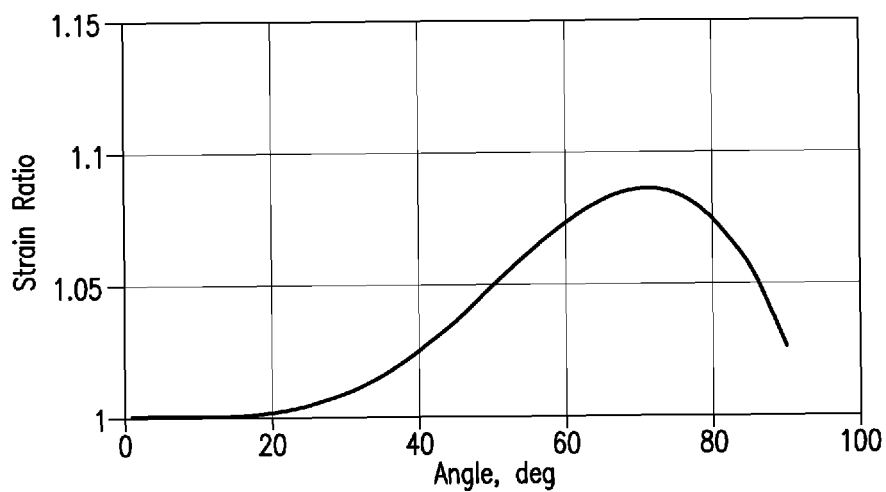
FIG. 7 is a graph showing strain ratio in relation to an angle depicted in FIG. 6.

With respect to the above equation for stress ($\sigma$), it is noted that the distance (y) of the fiber 18 from the neutral plane 42 is proportional to the stress ($\sigma$), but the area moment of inertia (I) is inversely proportional to the stress ($\sigma$). It should be further noted that while increasing the distance (y) of the fiber 18 from the neutral plane 42 of the cable 12, the addition of such a stiffening member 22 on one side of the cable 12 also has the effect of increasing the area moment of inertia of the cable 12 (I), which could result in decreased stress (σ) applied to the fiber 18, and correspondingly decreased signal should the area moment of inertia (I) be too great. Mechanical analysis of such designs reveal that as the area corresponding to the stiffening member 22 increases, initially the former effect (the increase in distance from the neutral plane 42) dominates. However, as the area continues to increase, and the area corresponding to the stiffening member 22 grows closer and closer to the geometric center 32 of the cable 12, the later effect begins to dominate, and the stress applied to the optical fiber 18 decreases. As a result, the size of the stiffening element 22 must be controlled so as to maximize the increase in the applied stress. FIGS. 6 and 7 demonstrate an analysis of the area of the stiffening element 22 of FIG. 2 and its effect on the strain applied to the fiber 18. The angle α, shown in FIG. 6, is defined as ½ the central angle θ measured from the center 32 (through which the central axis 24 passes) to the intersection of the chord 46 and the inner periphery 36 of the tubing 16. It can be readily understood that the area of the circular segment 44 is proportional to the angle α. That is, as the area of the circular segment 44 increases, so does the angle α, and as the area of the circular segment 44 decreases, so does the angle α. The strain ratio in the table shown in FIG. 7 represents the ratio of the strain applied to the fiber 18 when a stiffening member 22 taking the shape of a circular segment 44 of angle α is included in the cable 12 to the strain of a fiber in the absence of any stiffening member. FIG. 7 illustrates that the strain ratio increases steadily as the angle α increases until the angle α reaches approximately 70 degrees, at which point the strain ratio begins to decrease as the angle α increases. Thus, when selecting a size of the circular segment 44 for the stiffening member 22, an angle α between 60 and 80 degrees, and more specifically about 70 degrees may be chosen to maximize the strain ratio. Thus, the central angle θ may be selected to be between 120 and 160 degrees, and more specifically about 140 degrees to maximize the strain ratio. Likewise, with the other embodiments of the stiffening element 22, the area should be selected so as to maximize the stress applied to the fiber 18, as the same mechanical effect applies.

While the above-described embodiments have been described with respect to a single fiber 18 within the cable 12, it should be understood that the cable 12 may also include two or more fibers 18 within the cable 12. In order to increase the bending sensitivity of all of the fibers 18 within the cable 12, the arrangement of the fibers 18 should be diametrically opposite the position of the stiffening member 22 to shift the neutral plane 42 away from the fibers 18.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An optical cable comprising:
   a tubing;
   at least one optical fiber disposed within the tubing and at an inner periphery of the tubing; and,
   a stiffening member spaced from the at least one optical fiber and configured to bend with bending of the tubing;
   wherein the stiffening member and the at least one optical fiber are at least substantially diametrically opposed to each other with respect to the tubing to increase bending sensitivity of the at least one optical fiber, and the stiffening member shifts a neutral plane of the cable away from the at least one optical fiber.

2. The optical cable of claim 1, wherein a distance between the at least one optical fiber and the neutral plane of the cable is greater than a distance between the at least one optical fiber and a central axis of the tubing.

3. The optical cable of claim 1 wherein the distance between the at least one optical fiber and the neutral plane of the cable is greater than a distance between the stiffening member and the neutral plane.

4. The optical cable of claim 1 wherein the stiffening member and the at least one optical fiber are diametrically opposed within an inner periphery of the tubing.

5. The optical cable of claim 1 wherein the stiffening member is a filled shape along a section of the tubing.

6. The optical cable of claim 5, wherein a cross-section of the filled shape is a circular segment, and a chord of the circular segment is substantially parallel to the neutral plane.

7. The optical cable of claim 5, wherein a cross-section of the filled shape is a circular segment, and a central angle of the circular segment is between 120 degrees and 160 degrees.

8. The optical cable of claim 5, wherein the filled shape is extruded with the tubing to form a thickened section of the tubing having a wall thickness greater than a wall thickness of a section of the tubing opposite the thickened section.

9. The optical cable of claim 1, wherein the stiffening member is rigidly attached to the tubing.

10. The optical cable of claim 9, wherein the stiffening member is at least one wire.

11. The optical cable of claim 10, wherein the at least one wire is secured to an inner periphery of the outer tubing.

12. The optical cable of claim 10, wherein the at least one wire is secured to an outer periphery of the outer tubing.

13. The optical cable of claim 1, wherein the stiffening member is a section of the outer tubing having a stiffening material more rigid than a tubing material of a remainder of the outer tubing.

14. The optical cable of claim 1 wherein bending sensitivity of the optical fiber is proportional to a distance between the at least one optical fiber and the neutral plane of the cable.

15. The optical cable of claim 14 wherein the bending sensitivity of the optical fiber is inversely proportional to a cross-sectional area of the stiffening member.

16. A downhole system for downhole sensing, the system comprising:
   a downhole device adapted for use within a borehole; and,
   the optical cable of claim 1 attached to the downhole device.

17. The downhole system of claim 16 wherein the downhole device is a production tubing, a casing, or a downhole tool.

18. The downhole system of claim 16 wherein the optical cable is attached to the downhole device to arrange the stiffening member to be located closer to the downhole device than the at least one optical fiber.

19. The optical cable of claim 1, wherein the stiffening member is spaced from the neutral plane of the cable, and the neutral plane of the cable is disposed between the at least one optical fiber and the stiffening member.

20. An optical cable comprising:
   a tubing having a central axis;
   a stiffening member of the tubing configured to render a stiffness of the tubing asymmetric with respect to the central axis; and,
   at least one optical fiber spaced from the stiffening member and disposed within the tubing at a substantially diametrically opposite position from the stiffening member;
   wherein a distance between the at least one optical fiber and a neutral plane of the cable is greater than a distance between the at least one optical fiber and the central axis.

21. The optical cable of claim 20, wherein the stiffening member is spaced from the neutral plane of the cable, and the neutral plane of the cable is disposed between the at least one optical fiber and the stiffening member.

22. A method of increasing a bending sensitivity in an optical cable, the method comprising:
   positioning an optical fiber at an inner periphery of a tubing of the cable;
   positioning a stiffening member at a substantially diametrically opposite position from the optical fiber on the tubing of the cable;
   wherein the stiffening member shifts a neutral plane of the cable away from the optical fiber in the cable and increases bending sensitivity of the optical fiber.

23. The method of claim 22, wherein positioning the stiffening member on the tubing of the cable includes providing a filled shape on the inner periphery of the tubing, the filled shape having a cross-section of a circular segment.

24. The method of claim 23, further comprising attaching the optical cable to a downhole device by arranging the stiffening member to be located closer to the downhole device than the optical fiber.

25. The method of claim 22, wherein positioning a stiffening member on the outer tubing of the cable includes providing at least one wire on an inner or outer periphery of the outer tubing of the cable at a substantially diametrically opposite location of the optical fiber.

* * * * *